(12) United States Patent
Shen et al.

(10) Patent No.: US 7,803,219 B2
(45) Date of Patent: Sep. 28, 2010

(54) METHOD AND APPARATUS FOR PROCESSING INORGANIC ACIDIC GAS

(75) Inventors: Keh-Perng Shen, Jhudong Township, Hsinchu County (TW); Li-Ting Wang, Jhudong Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 252 days.

(21) Appl. No.: 12/222,678

(22) Filed: Aug. 14, 2008

(65) Prior Publication Data
US 2009/0044704 A1 Feb. 19, 2009

Related U.S. Application Data

(62) Division of application No. 11/269,615, filed on Nov. 9, 2005, now abandoned.

(30) Foreign Application Priority Data
Nov. 10, 2004 (TW) .............................. 93134292 A

(51) Int. Cl.
*B01D 53/14* (2006.01)
*B01D 53/40* (2006.01)

(52) U.S. Cl. .............................. 96/143; 96/355; 422/211

(58) Field of Classification Search .................. 96/134, 96/135, 143, 243, 290, 355; 95/92, 210, 95/230, 233; 423/220, 230, 240 S, 244.01, 423/243.08; 422/211
See application file for complete search history.

(56) References Cited

U.S. PATENT DOCUMENTS

| | | | | |
|---|---|---|---|---|
| 4,122,150 | A | * | 10/1978 | Hori et al. .............. 423/244.01 |
| 4,595,575 | A | * | 6/1986 | Oeste et al. .................. 423/210 |
| 5,435,981 | A | * | 7/1995 | Ichiki et al. .............. 423/239.1 |
| 6,068,686 | A | * | 5/2000 | Sorensen et al. .............. 96/135 |
| 2002/0146452 | A1 | | 10/2002 | Miller, III et al. |

FOREIGN PATENT DOCUMENTS

| | | | |
|---|---|---|---|
| CN | 1071189 | | 4/1993 |
| CN | 1240676 | | 1/2000 |
| EP | 0367998 | | 5/1990 |
| GB | 1 157 376 | | 7/1969 |
| GB | 1157376 | | 7/1969 |
| GB | 1 449 119 | | 9/1976 |
| JP | 54-58681 | * | 5/1979 |
| RU | 2138441 C1 | | 9/1999 |

* cited by examiner

*Primary Examiner*—Frank M Lawrence
(74) *Attorney, Agent, or Firm*—Bacon & Thomas, PLLC

(57) ABSTRACT

A method for treating waste gas containing inorganic acid is disclosed. The method includes the following steps: (a) forming a mixture of inorganic acidic gas and a nebulized alkaline solution wherein the nebulized alkaline solution can be produced continuously or periodically; (b) forcing the mixture to pass through an adsorbent bed; and (c) releasing the treated gas. An apparatus for treating the inorganic acid gas with the method illustrated above is also disclosed here. The method can regenerate poisoned adsorbents online, and save time, space and cost simultaneously.

11 Claims, 2 Drawing Sheets

METHOD AND APPARATUS FOR PROCESSING INORGANIC ACIDIC GAS

CROSS REFERENCES TO THE RELATED APPLICATIONS

This application is a divisional application of U.S. patent application Ser. No. 11/269,615, filed Nov. 9, 2005 now abandoned (of which the entire disclosure of the pending, prior application is hereby incorporated by reference).

BACKGROUND OF THE INVENTION

1. Field of the Invention

The present invention is related to one method and apparatus for processing waste gas; more particularly, one method and apparatus for processing waste gas containing inorganic acid.

2. Description of Related Art

Due to a huge amount of inorganic acids (mainly hydrochloric acid, hydrofluoroic acid, sulfuric acid, and nitric acid) being used in the semi-conductor industry to process wafer washing with acid or etching, the manufacturers discharge waste gas and waste water that contain inorganic acids, which cause very serious pollution of the environment. Traditionally, the packed wet scrubber is commonly used to process the removing of inorganic acidic gas. During the process of gas cleaning, a huge amount of washing solution is sprayed on the packing so as to have the effect of gas-liquid contacting and removing inorganic acidic gas. Although the packed scrubber generally includes demister for removing droplets in the tail gas, it is difficult to avoid very small droplets being carried along the airflow. Utilizing a demister may retain the droplets of the tail gas, yet the retained droplets easily accumulate on top of the demister. During long-term operation, there is still small amount of inorganic acidic gas discharged along with the tail gas due to the washing solution itself or the retained droplets reaching the vapor-liquid equilibrium.

Presently, the existing devices of inorganic acidic wet scrubbers in the semi-conductor industry all have difficulty in achieving the requirement of 95% elimination rate. This environmental problem that the semiconductor industry faces is as the same as the problem needing to be solved in other high-tech industries such as the TFT-liquid crystal display industry.

These kinds of exhausts containing inorganic acid are generally treated in the wet scrubber by adding alkaline solution to absorb or wash the inorganic acid. Gas phase pollutants (inorganic acidic gas) dissolved in the liquid phase quickly form ions through acid-base neutralization. Thus, resistance of mass transfer from the gas phase to liquid phase is not produced. However, due to the concentration of inorganic acidic pollutants manufactured in semi-conductors and photoelectric devices being not high, the driving force for mass transfer (difference of concentrations) in the gas phase is not significant. Thus it is not able to produce greater diffusion mass transfer through the difference of concentrations between the gas phase and gas-liquid interface. Therefore, the traditional wet scrubber designed utilizing the two-film theory in chemical engineering has a poor efficiency in processing low concentration (<10 ppmv, specifically <5 ppmv) inorganic acidic exhausts.

There is no preferred method for processing the aforementioned low-concentration inorganic acidic gas, however, there have been a few techniques developed to avoid the drawbacks of the aforementioned wet scrubber. One is to utilize wet active carbon to adsorb sulfur dioxide ($SO_2$) and hydrogen chloride (HCl) in waste gas. $SO_2$ absorbed in the active carbon will be catalyzed and converted to sulfuric acid ($H_2SO_4$), and then washed by water. The exhausted $H_2SO_4$ solution will be concentrated and again infused into the active carbon bed. HCl absorbed in the active carbon will then be replaced by the concentrated $H_2SO_4$ solution. Wet scrubber and alkaline solution will then absorb and wash HCl. Another technique infuses hydroxide of alkali metal or carbonate into active carbon. Drying under high temperature (120 to 160° C.) is employed to make the potassium concentration of the active carbon increase to 5.9~9.4%, and under such circumstances it has the ability to absorb $SO_2$ and hydrogen cyanide (HCN). Also another technique proposes that active carbon with 20~30 wt % calcium can remove gas containing chlorine or sulfur. However, the above-mentioned techniques have not mentioned the processing method for low concentration (<10 ppmv, especially <5 ppmv) inorganic acidic gas, nor the regeneration method of active carbon when its absorbency has been depleted.

In absorbent reuse relating techniques, there is one item of equipment for processing hydrogen sulfide gas in a wastewater treatment plant. The equipment utilizes an active carbon bed after being immersed in a sodium hydroxide solution as the adsorbent. The adsorbent bed has a thickness of 3 ft. When the adsorbability of the active carbon bed has been depleted, it requires an additional spare active carbon bed to alternatively function on-line, while the regeneration of adsorbability of active carbon bed is processed off-line. That is, the technique requires the active carbon bed to be offline for regeneration. Thus the stated equipment is not favorable for application in limited space. Moreover, the regeneration of the adsorbent bed requires five to fifteen days. In addition, the active carbon bed can only be regenerated for three to four times, resulting in short use life of the adsorbent.

It is therefore in great need to provide a long-term and stable method and apparatus for processing inorganic acidic gas to solve the problems of low concentration inorganic acidic gas in photoelectric device and semiconductor manufacturing.

SUMMARY OF THE INVENTION

The present invention discloses a regenerative de-acid apparatus for inorganic acidic gas, comprising: a tank having an gas inlet and an exhaust outlet; at least one adsorbent bed having one adsorbent, wherein the adsorbent bed is received inside the tank; at least one alkaline solution supply unit that is placed inside the tank and providing at least one alkaline solution to the at least one adsorbent bed; and at least one washing solution supply unit, positioned inside the tank and providing a solution for washing the at least one adsorbent; wherein the alkaline solution supply unit is placed between the adsorbent bed and the gas inlet.

The present invention also provides a regeneration method of adsorbent for processing inorganic acidic gas, comprising the following steps: (a) washing an adsorbent with a washing solution; and (b) spraying the said adsorbent with, or immersing the same within, a nebulized alkaline solution.

The present invention also discloses a method for processing inorganic acidic gas, comprising the following steps: (a) forming a mixture of inorganic acidic gas and a nebulized alkaline solution wherein the nebulized alkaline solution can be produced continuously or periodically; (b) forcing the mixture to pass through an adsorbent bed, wherein the said adsorbent is washed by water, or sprayed or immersed by alkaline solution; and (c) releasing the treated gas.

The present invention further discloses a regenerative de-acid system for inorganic acidic gas, comprising: a piping having plurality of branch pipe each with an opening; and a plurality of regenerative de-acid apparatuses for inorganic acidic gas. Each regenerative de-acid apparatus comprises: a tank having an gas inlet and an exhaust outlet; at least one adsorbent bed, which is received inside the tank and includes an adsorbent; at least one alkaline solution supply unit, which is received inside the tank and provides at least one alkaline solution to the at least one adsorbent bed; and at least one washing solution supply unit, which is received inside the tank and provides a solution for washing the at least one adsorbent; wherein the alkaline solution supply unit is positioned between the adsorbent bed and the gas inlet; and each gas inlet of the tank connects to an opening of the branch tubing.

The applications of the regenerative de-acid system for inorganic acidic gas according to the present invention are not restricted, and can be applied in prior inorganic acidic gas processing. The piping of the present invention may connect to prior apparatus for processing inorganic acidic gas, such that the piping of the present invention may connect to the exhausting port of the inorganic acidic gas in the wet scrubber. Also, the wet scrubber of the present invention can be any prior wet scrubber, but preferably is a Venturi scrubber, packed scrubber for vapor-liquid co-current, vapor-liquid counter-current, or vapor-liquid crossflow, spray scrubber or other scrubbers with the same effect.

The apparatus and method of the present invention can deal with inorganic acidic gas with any concentration, even with low concentration. The apparatus and method of the present invention preferably deal with inorganic acidic gas with a concentration lower than 5 ppmv, and the efficiency is as high as 95%.

The regenerative de-acid system according to the present invention can simultaneously install multiple sets of regenerative processing apparatus for inorganic acidic gas. Thus the adsorbent bed can directly be regenerated in situ on-line, whereby the prior expense for exchanging depleted adsorbents can be therefore eliminated. Also the processing time and the space occupied for manufacturing can be reduced. Moreover, regionally spraying, showering, or immersing in clean water or hot water at set time washes and removes the salts produced in acid-base neutralization. Thus it is not required to stop production to change the depleted adsorbent. The system will be maintained quite stable for a long time and provide high efficiency for processing low concentration inorganic acidic gas, thereby solving the environmental problems of traditional wet scrubbers in photoelectric device and semiconductor industries.

The alkaline solution used in the method disclosed in the present invention can be any prior alkaline solution, but preferably is potassium hydroxide solution, sodium hydroxide solution or their mixture. The concentration of the alkaline solution is not restricted, but preferably is with a weight percentage more than 5 wt %. The weight percentage more than 15 wt % is even better. The weight percentage more than 25 wt % is the second best concentration, while saturated concentration of 90% is the best choice. The diameter of the tiny droplet produced by nebulization of the alkaline solution is approximately smaller than 2 mm. The diameter of the droplet is preferably smaller than 500 μm, while it is better to be smaller than 100 μm. The best droplet diameter is smaller than 50 μm.

The adsorbent bed used in the present invention can be of any prior thickness, but a thickness ranging from 1 cm to 60 cm is good. Further, a thickness ranging from 2 cm to 45 cm is better, while a thickness ranging from 2 cm to 30 cm is the best.

The present invention deals with any prior inorganic acidic gas, but preferably deals with hydrofluoric acid, hydrochloric acid, nitric acid, sulfuric acid, phosphoric acid, or mixtures of any two of the aforementioned inorganic acidic gas.

The water used to dissolve the salt crystal in the present invention can be any prior water, but preferably is de-ionized water with temperature higher than 20° C., pure water processed by reverse osmosis, distilled water, tap water, or mixed solution of any two of the aforementioned waters.

The adsorbent used in the present invention can be any prior adsorbent, but preferably is selected from spherical active carbon, granular active carbon, pulverized active carbon, active carbon fabric, zeolite adsorbent, or mixtures of any two of the aforementioned materials with adsorbability.

The regenerative de-acid apparatus according to the present invention can further be installed with multiple functional units depending on the need to improve its function. It is preferably to install one valve, which closes when one washing solution cleans one adsorbent, on each gas inlet to prevent contamination.

The installation method for the adsorbent bed according to the invention is not restricted, but preferably is zigzag, donut cylindrical, or individual sheets in parallel connection. Moreover, the configuration of the alkaline solution supply unit can be any prior configuration, but preferably each adsorbent bed has a corresponding alkaline solution supply unit attached.

DETAILED DESCRIPTION OF THE PREFERRED EMBODIMENT

Figure 1:
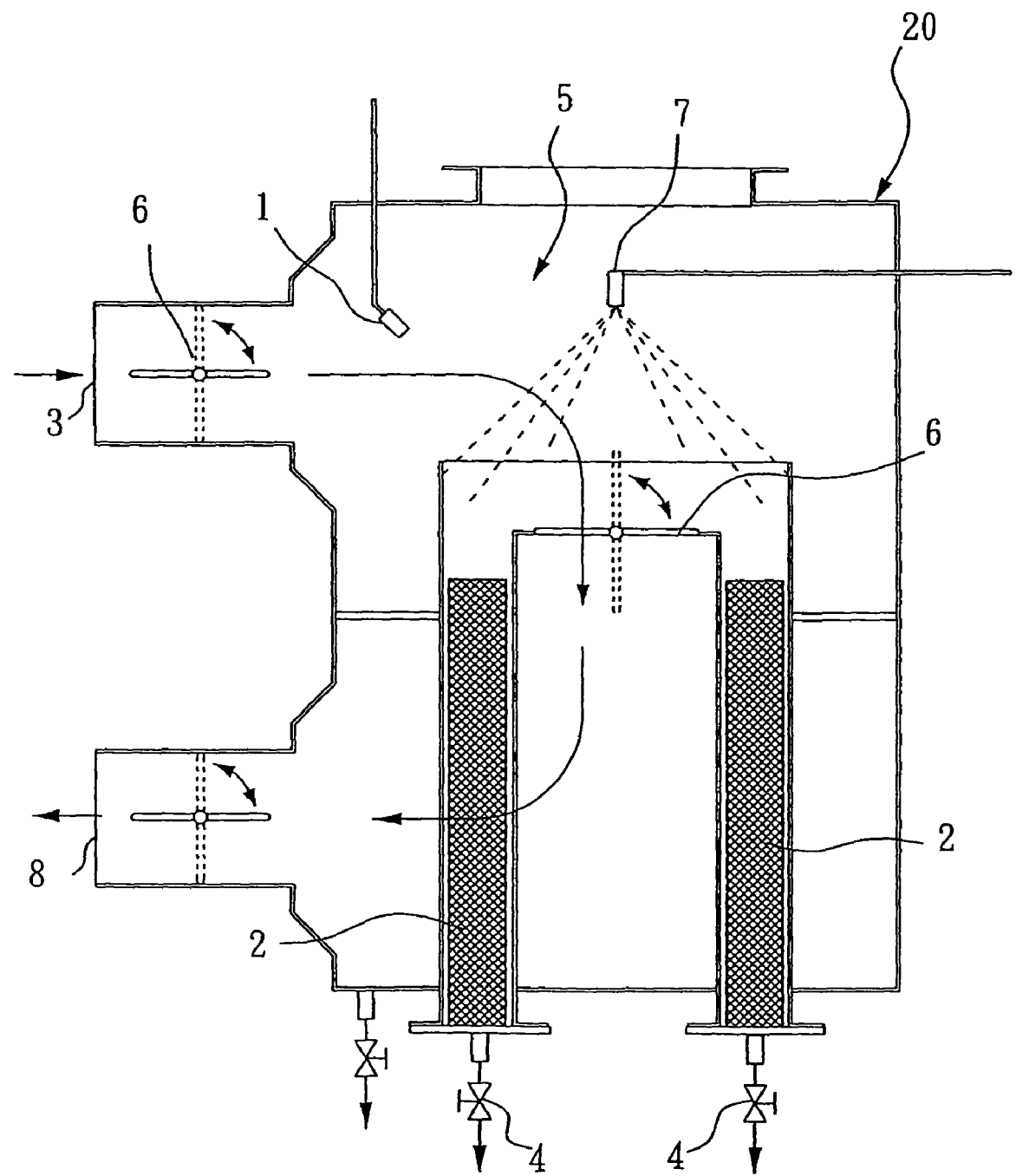
FIG. 1 is a cross-sectional view of the regenerative de-acid apparatus for inorganic acidic gas according to the present invention.

Referring to FIG. 1, a regenerative de-acid apparatus 20 for inorganic acidic gas of the present invention comprises: a tank 5 having one gas inlet 3 and one exhaust outlet 8; and the tank 5 includes an alkaline solution supply unit 1, an adsorbent bed 2 (preferably an adsorbent bed for active carbon), a washing solution supply unit 7, and a washing solution and an alkaline solution draining valve 4. The alkaline supply unit 1 is mounted between the gas inlet 3 and adsorbent bed 2. The washing solution supply unit 7 can be placed on top of, below, or on the side of the adsorbent bed 2. Furthermore, the alkaline solution supply unit 1 and the washing solution supply unit 7 may be the same apparatus. The gas inlet 3 and exhaust outlet 8 can both include an on-and-off gate 6; the on-and-off gate 6 can also be only installed in either gas inlet 3 or exhaust outlet 8; or the on-and-off gate 6 can be installed in any position that can block the airflow from passing through the adsorbent bed 2 to control the airflow from getting in and out.

The practice of processing inorganic acidic gas of the present invention comprises the following steps. When one inorganic acidic gas enters via the gas inlet 3, the alkaline solution supply unit 1 will nebulize the alkaline solution to produce tiny droplets (the supply of the alkaline solution can be continuous or periodic). The nebulized droplets can be brought into the adsorbent bed 2 of the donut cylinder along with the inorganic acidic gas. Inorganic acidic gas and salt crystal produced by acid-base neutralization will be adsorbed in the adsorbent bed 2. The de-acid gas will be released via the exhaust outlet 8.

The alkaline solution on the adsorbent bed 2, after being used for a period of time, will be neutralized and then carry salts after the acid-base neutralization. This will cause the adsorbing efficiency to decrease. Therefore, to prolong the term of use of the adsorbent bed 2, the salts of the adsorbent bed 2 must be dissolved by washing method. Then the adsorbent bed 2 can be sprayed or immersed in the alkaline solution to regenerate the adsorbent bed 2. The specific practice is illustrated below.

First of all, gate 6 which is installed between the gas inlet 3 and the adsorbent bed 2 is closed in order to blocks the airflow. The adsorbent bed 2 is thus separated/isolated from other apparatuses for processing inorganic acidic gas. Alternatively, directly utilizing the washing solution supply unit 7 can provide a huge amount of washing solution to submerge the adsorbent bed 2 completely, forming resistance for the airflow to prevent the waste gas from entering.

When one specific adsorbent bed 2 is undergoing the dissolution and washing of salt crystal, the following steps are taken. Infusing the washing solution and submerging the specific adsorbent bed, then shutting down the washing solution supply unit 7. Utilizing the circulation pump (not shown) to form circulation on the two sides of the adsorbent bed 2. After circulating for a period of time (be it a few minutes to ten minutes), eliminating and changing the washing solution to have the effect of dissolving and removing the salt crystal. (After releasing the washing solution, a new washing solution may be infused again to process circulation cleaning, for a better result.) A further alternative is to continuously infuse a washing solution to flow through the adsorbent bed 2 to have the effect of dissolving and removing the salt crystal.

During the period between two operations for processing dissolving and removing salt crystals, at least regenerate the adsorbent once, by either using the alkaline solution supply unit 1 to provide nebulized droplets of high concentration alkaline solution or by directly immersing the adsorbent with high concentration alkaline solution. The aqueous solution with ions, after the operation of dissolving and removing salts, can be evaporated to take away the water utilizing tail gas. Alternatively, the aqueous solution may be solarized or heated by a surface evaporator via other methods, causing the water to evaporate or even precipitating salt crystals, to reduce the amount of waste water, attaining the effect of no release of waste water.

After removing the salt crystal of the adsorbent bed and releasing the washed waste water by the aforementioned method, alkaline solution supply unit 1 installed behind the gas inlet 3 is utilized to regularly nebulize one certain amount of high concentration alkaline solution and provide it to the adsorbent bed 2. Gate 6 that blocks the airflow when the adsorbent bed 2 is in its regenerating-processing condition is re-opened. The processed inorganic acidic gas, after passing through adsorbent bed, is released via the exhaust outlet 8.

Figure 2:
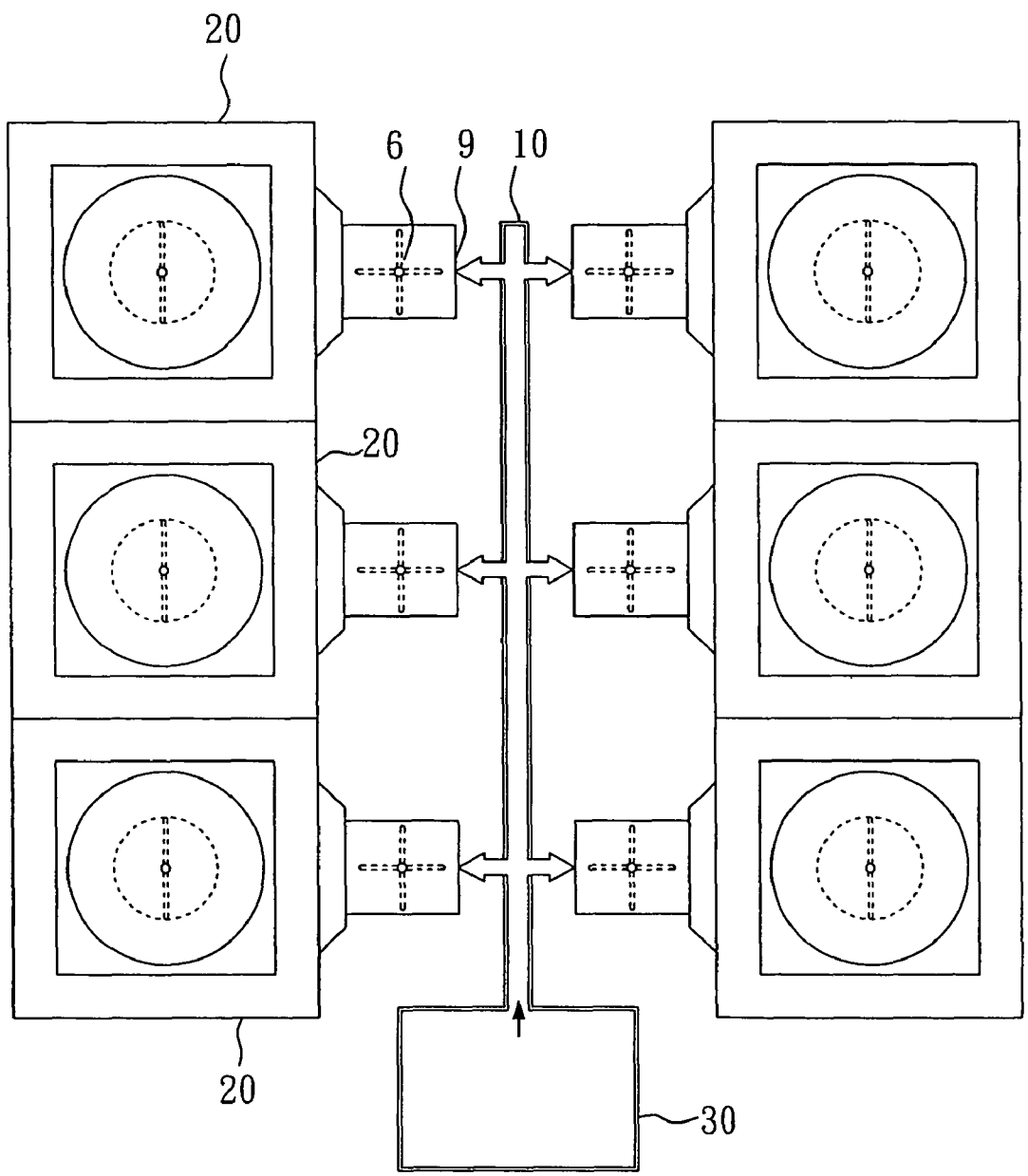
FIG. 2 is the system configuration diagram of the regenerative de-acid apparatus for inorganic acidic gas according to the present invention.

A more specific preferred embodiment of the present invention is the de-acid system for low concentration inorganic acidic gas. Referring to FIG. 2, the source of acidic gas 30 may be a pipeline of a factory in which acidic gas is released, an emission pipe for acidic gas produced in mechanical operations, or an apparatus for processing acidic gas. In this preferred embodiment, the source of acidic gas 30 is the wet scrubber. A piping 10 comprising a plurality of branch pipe each with an opening 9 connected to the wet scrubber. Each opening 9 further connects to one set of regenerative de-acid apparatus 20 to filter and adsorb tail gas of the wet scrubber. Alkaline solution is nebulized in the alkaline solution supply unit 1 installed in front of the adsorbent bed 2. The nebulized alkaline solution is then brought to the adsorbent bed 2 by tail gas of the scrubber to regenerate adsorbent, maintaining the effectiveness for processing low concentration inorganic acidic gas.

Preferred Embodiment 1

Cylindrical active carbon with a weight of about 4.08 kg, diameter of 0.5 cm, and length of 1 cm is immersed completely in 3 N KOH solution for four hours. The immersed cylindrical active carbon is removed, the KOH solution is discarded, and the air-dried active carbon is packed to the active carbon adsorbent bed. The packing thickness is approximately 15 cm. Gas (2 m$^3$/min) having low concentration HCl is conducted to initiate the system operation for processing inorganic acidic gas.

After continuously operating for 48 hours, the testing method NIEA A452.70B (EPA. R.O.C.) is utilized to process sample analysis of before and after waste gas concentration. The HCl concentrations before and after waste gas processing are 27.0 mg/Nm$^3$ (16.6 ppm) and 0.231 mg/Nm$^3$ (0.142 ppm) respectively. The effectiveness of processing the low concentration HCl waste gas is as high as 99.1%.

Preferred Embodiment 2

Cylindrical active carbon with a weight of about 4.08 kg, diameter of 0.5 cm, and length of 1 cm is immersed completely in 3 N KOH solution for four hours. The immersed cylindrical active carbon is taken out, the KOH solution is discarded, and the air-dried active carbon is packed to the active carbon adsorbent bed. The packing thickness is approximately 15 cm. Gas (2 m$^3$/min) having low concentration HCL is conducted to initiate the system operation for processing inorganic acidic gas.

After continuously operating for 15 hours, the testing method NIEA A452.70B (EPA. R.O.C.) is utilized to process sample analysis of before and after waste gas concentration. The HCl concentrations before and after waste gas processing are 2.07 mg/Nm$^3$ (1.271 ppm) and 0.0635 mg/Nm$^3$ (0.039 ppm) respectively. The effectiveness of processing the low concentration HCl waste gas is as high as 96.9%.

Preferred Embodiment 3

Cylindrical active carbon with a weight of about 4.08 kg, diameter of 0.5 cm, and length of 1 cm is immersed completely in 3 N KOH solution for four hours. The immersed cylindrical active carbon is removed, the KOH solution is discarded, and the air-dried active carbon is packed to the active carbon adsorbent bed. The packing thickness is approximately 15 cm. Gas (4.5 m$^3$/min) having low concentration HCl is conducted to initiate the system operation for processing inorganic acidic gas.

After continuously operating for 15 hours, the testing method NIEA A452.70B (EPA. R.O.C.) is utilized to process sample analysis of before and after waste gas concentration. The HCl concentration before and after waste gas processing are 0.245 mg/Nm$^3$ (150 ppb) and 0.0205 mg/Nm$^3$ (13 ppb) respectively. The effectiveness of processing the low concentration HCL waste gas is as high as 91.6%.

Preferred Embodiment 4

Cylindrical active carbon with a weight of about 3.40 kg, diameter of 0.5 cm, and length of 1 cm is immersed completely in 3 N KOH solution for four hours. The immersed cylindrical active carbon is removed, the KOH solution is discarded, and the air-dried active carbon is packed to the active carbon adsorbent bed. The packing thickness is approximately 12.5 cm. Gas (4.5 m$^3$/min) having low concentration HCl is conducted to initiate the system operation for processing inorganic acidic gas.

After continuously operating for 8 hours, the testing method NIEA A452.70B (EPA. R.O.C.) is utilized to process sample analysis of before and after waste gas concentration. The HCl concentrations before and after waste gas processing are 0.920 mg/Nm$^3$ (565 ppb) and 0.0381 mg/Nm$^3$ (23 ppb) respectively. The effectiveness of processing the low concentration HCL waste gas is as high as 95.9%.

Preferred Embodiment 5

Cylindrical active carbon with a weight of about 3.40 kg, diameter of 0.5 cm, and length of 1 cm is immersed completely in 6 N KOH solution for four hours. The immersed cylindrical active carbon is removed, the KOH solution is discarded, and the air-dried active carbon is packed to the active carbon adsorbent bed. The packing thickness is approximately 12.5 cm. Gas (3.5 m$^3$/min) having low concentration HCl is conducted.

After continuously operating for 13 hours, the testing method NIEA A452.70B (EPA. R.O.C.) is utilized to process sample analysis of before and after waste gas concentrations. The HCl concentrations before and after waste gas processing are 0.715 mg/Nm$^3$ (439 ppb) and 0.021 mg/Nm$^3$ (13 ppb) respectively. The effectiveness of processing the low concentration HCl waste gas is as high as 97.1%.

Preferred Embodiment 6

Cylindrical active carbon with a weight of about 3.40 kg, diameter of 0.5 cm, and length of 1 cm is immersed completely in 6 N KOH solution for four hours. The immersed cylindrical active carbon is removed, the KOH solution is discarded, and the air-dried active carbon is packed to the active carbon adsorbent bed. The packing thickness is approximately 12.5 cm. Gas (3.5 m$^3$/min) having low concentration HCl is conducted.

After continuously operating for 4 hours, the testing method NIEA A452.70B (EPA. R.O.C.) is utilized to process sample analysis of before and after waste gas concentrations. The HCl concentrations before and after waste gas processing are 8.550 mg/Nm$^3$ (5,250 ppb) and 0.201 mg/Nm$^3$ (123 ppb) respectively. The effectiveness of processing the low concentration HCL waste gas is as high as 97.6%.

Preferred Embodiment 7

Cylindrical active carbon with weight about 120 g, diameter of 0.5 cm, and length of 1 cm is immersed completely in 3 N KOH solution for four hours. The immersed cylindrical active carbon is removed, the KOH solution is discarded, and the active carbon is respectively packed to two sets of active carbon adsorbent beds. The packing thickness is approximately 2.5 cm. Gas (300 LPM) having low HCl concentration is conducted (HCl detector tube shows a detected concentration around 2 to 3 ppmv, and standard swept volume of 100 mL). An HCl detector tube with a graduation of 1 ppmv is utilized to measure the HCl concentration in processed waste gas every 0.25 hour. When the same detector tube pumps for five times (with swept volume of 500 mL) and there is color changing in the gas inlet of the detector tube, it is considered penetrated. At this point the HCl concentration in the waste gas is about 0.02 ppmv.

Penetrated active carbon is washed by water to remove HCl. 10 to 15 mL 3 N KOH solution is sprayed onto the cylindrical active carbon bed. Then 300 LPM gas having low HCl concentration is conducted again. The HCl concentration in processed waste gas is continuously measured every 0.25 hour until the active carbon bed is again penetrated. Repeat (1) conducting gas into the adsorbent bed to let the acidic gas be adsorbed; (2) if the adsorption is ineffective, the adsorbed salt on the adsorbent bed is washed; (3) alkaline solution is sprayed to regenerate the adsorbability of the adsorbent; (4) gas is re-conducted into the adsorbent bed to let the acidic gas be adsorbed and other steps as illustrated are repeated until six times are completed. The test result shows that re-spraying the alkaline solution can remove low concentration HCl in the waste gas. The test result is shown in Table 1.

Penetrated active carbon is circularly washed by 25° C. deionized water for 1 hour. The washing solution sample, after being analyzed by an ion analyzer, has chloride ion with concentrations of 1,040 ppm (mg/L), 1,110 ppm (mg/L), 1,210 ppm (mg/L), 1,350 ppm (mg/L) and 1,640 ppm (mg/L) respectively. The active carbon of the fifth test, other than being analyzed after being washed for 1 hour, is further circularly washed for 2 and 3 hours. Sample analyzing results show that the chloride ion concentrations are 506 ppm (mg/L) and 164 ppm (mg/L) respectively, confirming that utilizing water washing and re-spraying high concentration alkaline solution indeed regenerate penetrated active carbon.

| Test Number | First Set of Penetration Time (Min) | Second Set of Penetration Time (Min) | Concentration of Chloride Ion in Washing Solution (mg/L) |
|---|---|---|---|
| First time | 105 | 105 | 1,040 |
| Second time | 105 | 105 | 1,110 |
| Third time | 120 | 120 | 1,210 |
| Forth time | 75 | 75 | 1,350 |
| Fifth time | 105 | 105 | 1,640/506/164 |
| Sixth time | 105 | 105 | Not tested |

Preferred Embodiment 8

Cylindrical active carbon with a weight of about 240 g, diameter of 0.5 cm, and length of 1 cm is immersed completely in 3 N KOH solution for four hours. The immersed cylindrical active carbon is removed, the KOH solution is discarded, and the active carbon is then respectively packed to two sets of active carbon adsorbent beds. The packing thickness is approximately 5.0 cm. Gas (300 LPM) having low HCl concentration is conducted respectively (HCl detector tube shows a detected concentration around 2 to 3 ppmv, and standard swept volume of 100 mL).

Repeat the experiments twice for both sets. Penetrated active carbon is then circularly washed by 500 mL of 25 20 C. and 50° C. deionized water for 1 hour. The washing solution sample from washing penetrated active carbon by using 25 20 C. deionized water, after being analyzed by an ion analyzer, has chloride ion with concentrations of 1,880 ppm (mg/L) and 2,160 ppm (mg/L). The washing solution sample from washing penetrated active carbon by using 50 20 C. deionized water, after being analyzed by an ion analyzer, has chloride ion with concentrations of 2,330 ppm (mg/L) and 3,360 ppm (mg/L). Therefore, it is known that utilizing hot water for washing can get the better regenerative effect.

Preferred Embodiment 9

Cylindrical active carbon with a weight of about 120 g, diameter of 0.5 cm, and length of 1 cm is immersed completely in 6 N KOH solution for four hours. The immersed cylindrical active carbon is removed, the KOH solution is discarded, and the active carbon is then respectively packed to two sets of active carbon adsorbent beds. The packing thickness is approximately 2.5 cm. Gas (300 LPM) having low HCl concentration is conducted respectively (HCl detector tube shows a detected concentration around 1.5 to 3.5 ppmv, and standard swept volume of 100 mL). An HCl detector tube with a graduation of 1 ppmv is utilized to measure the HCl concentration in processed waste gas every 0.25 hour. When the same detector tube pumps for five times (with swept volume of 500 mL) and there is color changing in the gas inlet of the detector tube, it is considered penetrated. At this point the HCl concentration in the waste gas is about 0.02 ppmv.

25 to 30 mL 6 N KOH solution is sprayed onto the cylindrical active carbon bed. Then 300 LPM gas having low HCl concentration is conducted again. The HCl concentration in processed waste gas is continuously measured every 0.25 hour until the active carbon bed is again penetrated. Repeat (1) conducting gas into the adsorbent bed to let the acidic gas be adsorbed; (2) if the adsorption is ineffective, the adsorbed salt is washed on the adsorbent bed; (3) spraying alkaline solution to regenerate the adsorbability of the adsorbent; (4) gas is re-conducted into the adsorbent bed to let the acidic gas be adsorbed and other steps are repeated as illustrated for five times (1 cycle) until completion. 50° C. hot water is infused to immerse the active carbon bed and the active carbon bed is circularly washed for 1 hour to wash and remove adsorbed HCl. After releasing the washing solution, 6N KOH solution is infused to the active carbon bed to regenerate the adsorbent bed by immersing it in an alkaline solution. Repeat (1) conducting gas into the adsorbent bed to let the acidic gas be adsorbed; (2) if the adsorption is ineffective, the adsorbed salt on the adsorbent bed is washed; (3) alkaline solution is sprayed to regenerate the adsorbability of the adsorbent; (4) gas is re-conducted into the adsorbent bed to let the acidic gas be adsorbed and other steps are repeated as illustrated for total of 15 times (3 cycles). The test result shows that the adsorbent bed can be regenerated on-line by re-spraying alkaline solution (or by washing adsorbed HCl by hot water and immersed by alkaline solution). Also the result shows that the regenerated adsorbent bed can remove low concentration HCl in the waste gas. The test result is listed in Table 2. Moreover, the adsorbability of the repeatedly regenerated adsorbent bed does not show obvious depletion. Utilizing 50° C. hot water for washing and re-spraying or immersing high concentration alkaline solution, together with the design of plurality of adsorbent beds, can indeed regenerate penetrated active carbon online for repeated use. Therefore, the present invention is effective in processing low concentration inorganic acidic gas.

| Test Number | | First set for breakthrough Time testing (Min) | Second set for breakthroughTime testing (Min) |
|---|---|---|---|
| First Circulation | 1-1 | 255 | 240 |
| | 1-2 | 210 | 195 |
| | 1-3 | 175 | 175 |
| | 1-4 | 195 | 195 |
| | 1-5 | 180 | 165 |
| Second Circulation | 2-1 | 240 | 240 |
| | 2-2 | 195 | 180 |
| | 2-3 | 195 | 195 |
| | 2-4 | 165 | 180 |
| | 2-5 | 180 | 180 |
| Third Circulation | 3-1 | 270 | 270 |
| | 3-2 | 255 | 240 |
| | 3-3 | 240 | 240 |
| | 3-4 | 225 | 240 |
| | 3-5 | 210 | 210 |

Therefore, the test result of processing the inorganic acidic gas utilizing the equipment of the present invention confirms that the present invention is effective in removing low concentration (<5 ppm) hydrochloric acidic gas. Moreover, the system can be maintained stable even in long-term operations. This solves the problem of traditional wet scrubber that it cannot effectively process low concentration (especially <5 ppmv) for the semi-conductor industry.

Although the present invention has been explained in relation to its preferred embodiment, it is to be understood that many other possible modifications and variations can be made without departing from the spirit and scope of the invention as hereinafter claimed.

What is claimed is:

1. A regenerative de-acid apparatus for inorganic acidic gas, comprising:
   a tank having an gas inlet and an exhaust outlet;
   at least one adsorbent bed having one adsorbent, wherein the adsorbent bed is received inside the tank;
   at least one alkaline solution supply unit placed inside the tank and providing at least one alkaline solution to the at least one adsorbent bed; and
   at least one washing solution supply unit, positioned inside the tank and providing a solution for washing the said at least one adsorbent; wherein the alkaline solution supply unit is placed between the adsorbent bed and the gas inlet.

2. The regenerative de-acid apparatus for inorganic acidic gas as claimed in claim 1, wherein the alkaline solution is potassium hydroxide solution, sodium hydroxide solution or their mixture.

3. The regenerative de-acid apparatus for inorganic acidic gas as claimed in claim 1, wherein the said at least one adsorbent is spherical active carbon, granular active carbon, pulverized active carbon, active carbon fabric, zeolite adsorbent, or mixtures of any two of the aforementioned materials with adsorbability.

4. The regenerative de-acid apparatus for inorganic acidic gas as claimed in claim 1, wherein the thickness of the said at least one adsorbent bed is 1 cm to 60 cm.

5. The regenerative de-acid apparatus for inorganic acidic gas as claimed in claim 1, wherein the washing solution supply unit provides de-ionized water, pure water processed by reverse osmosis, distilled water, tap water, or mixed solution of any two of the aforementioned waters.

6. The regenerative de-acid apparatus for inorganic acidic gas as claimed in claim 1, wherein the said gas inlet comprises a gate that is in a closed status when the washing solution supply unit is washing the said adsorbent.

7. The regenerative de-acid apparatus for inorganic acidic gas as claimed in claim 1, further comprising a gate positioned between the said gas inlet and the adsorbent bed, the said gate is in a closed status when the washing solution unit is washing the said adsorbent.

8. A regenerative de-acid system for inorganic acidic gas, comprising:
- a piping having plurality of branch pipe each with an opening; and
- a plurality of regenerative de-acid apparatuses for inorganic acidic gas, wherein each regenerative de-acid apparatus comprises:
- a tank having an gas inlet and an exhaust outlet;
- at least one adsorbent bed, which is received inside the tank and includes an adsorbent;
- at least one alkaline solution supply unit, which is received inside the tank and provides at least one alkaline solution to the at least one adsorbent bed; and
- at least one washing solution supply unit, which is received inside the tank and provides a solution for washing the at least one adsorbent;
- wherein the alkaline solution supply unit is positioned between the adsorbent bed and the gas inlet; and
- each gas inlet of the tank connects to a respective opening of the branch pipe.

9. The regenerative de-acid apparatus for inorganic acidic gas as claimed in claim 8, wherein the said alkaline solution is potassium hydroxide solution, sodium hydroxide solution or their mixture.

10. The regenerative de-acid apparatus for inorganic acidic gas as claimed in claim 8, wherein the said at least one adsorbent is spherical active carbon, granular active carbon, pulverized active carbon, active carbon fabric, zeolite adsorbent, or mixtures of any two of the aforementioned materials with adsorbability.

11. The regenerative de-acid apparatus for inorganic acidic gas as claimed in claim 8, wherein the said gas inlet comprises a gate in a closed status when the washing solution supply unit is washing the said adsorbent.

* * * * *